United States Patent [19]
Swanbery et al.

[11] Patent Number: 6,031,843
[45] Date of Patent: Feb. 29, 2000

[54] DIGITAL COMMUNICATIONS SWITCHING FABRIC

[75] Inventors: Adam R. Swanbery, Chantilly, Va.; Christian Collin Dit de Montesson, Orvault; Michel Accarion, Nantes, both of France; David E. Williamson, Warrenton, Va.; Perry W. Makris, Chantilly, Va.; Jonathan B. White, Reston, Va.; Jean-Claude Brethome, Sainte Luce sur Loire, France

[73] Assignee: Alcatel Data Networks Inc., Ashburn, Va.

[21] Appl. No.: 08/754,395

[22] Filed: Nov. 21, 1996

[51] Int. Cl.[7] .......................................................... H04J 3/02
[52] U.S. Cl. ............................................. 370/426; 370/422
[58] Field of Search ....................................... 370/351, 357, 370/358, 359, 360, 361, 369, 375, 380, 381, 382, 383, 384, 387, 388, 422, 426, 389

[56] References Cited

U.S. PATENT DOCUMENTS

| | | |
|---|---|---|
| Re. 34,755 | 10/1994 | Eng et al. . |
| Re. 34,811 | 12/1994 | Eng et al. . |
| 4,651,318 | 3/1987 | Luderer .................................... 370/422 |
| 4,862,451 | 8/1989 | Closs et al. .............................. 370/423 |
| 5,172,371 | 12/1992 | Eng et al. . |
| 5,260,934 | 11/1993 | Tanaka et al. . |
| 5,260,935 | 11/1993 | Turner . |
| 5,289,461 | 2/1994 | de Nijs . |
| 5,305,311 | 4/1994 | Lyles . |
| 5,309,432 | 5/1994 | Kanakia . |
| 5,311,509 | 5/1994 | Heddes et al. . |
| 5,321,691 | 6/1994 | Pashan . |
| 5,327,420 | 7/1994 | Lyles . |
| 5,329,524 | 7/1994 | Paker et al. . |
| 5,339,311 | 8/1994 | Turner . |
| 5,390,170 | 2/1995 | Sawant et al. . |
| 5,402,415 | 3/1995 | Turner . |
| 5,408,463 | 4/1995 | Merchant et al. . |
| 5,412,653 | 5/1995 | Hoppe et al. . |
| 5,422,880 | 6/1995 | Heitkamp et al. . |
| 5,430,716 | 7/1995 | Pawelski . |
| 5,434,852 | 7/1995 | LaPorta et al. . |
| 5,436,893 | 7/1995 | Barnett . |

*Primary Examiner*—Huy D. Vu
*Attorney, Agent, or Firm*—Ware, Fressola, Van Der Sluys & Adolphson LLP

[57] ABSTRACT

A type of switching fabric for exchanging variable-size frames of digital information between frame processors coupled directly or indirectly to one or more digital communication lines. It comprises one or more multi-line serial communication controllers (MSCCs), and a backplane providing a full mesh of serial point-to-point bi-directional links between each MSCC, and, in a loopback, from each MSCC back to itself. The MSCCs collectively manage the transfer of variable-size frames between the frame processors. To transfer digital information from a source line to a destination line, a frame processor coupled to the ingress line drives the switching fabric by signaling its MSCC that there is information. The ingress MSCC then switches the digital information through the backplane to the MSCC serving the frame processor coupled to the egress line. The switching fabric uses a clocking scheme that makes possible high throughput rates.

24 Claims, 3 Drawing Sheets

DIGITAL COMMUNICATIONS SWITCHING FABRIC

TECHNICAL FIELD

The present invention pertains to the field of digital communication controllers. More particularly, this invention relates to a broadband switching fabric for switching, between digital communication lines, variable-size frames of digital information.

BACKGROUND OF THE INVENTION

A digital switch system routes digital information from an incoming digital communication line to an outgoing digital communication line. As the term is used here, digital communication line means a bi-directional connection that may be one physical wire for each direction of digital information flow, or one wire that is sometimes used for one direction and sometimes used for the other. A switch typically consists of a chassis with slots to accommodate a number of access cards, each usually connected to several of the digital communication lines serviced by the switch. (A high-speed line, such as a 45 Mbps DS-3, may be connected to a card by itself.)

A switching fabric, as the term is used here, is a part of the switch that moves the digital information to and from the random access memory (RAM) of line processors connected directly to the digital communication lines. There can be more than one switching fabric in a switch, and there can be different types of switching fabrics for moving different types of digital information. Each digital communication line is connected, through its line processors, to only one switching fabric.

The switching fabric of the present invention is used in a switch that switches variable-size frames of digital information-such as a layer-two data unit for the Frame Relay switching protocol, or a layer-three packet according to the X.25 switching protocol.

There are different ways of implementing a switching fabric. One way uses a shared bus to move data between access cards. With a shared bus, each of the access cards takes turns using the bus. One problem with this implementation is that a malfunction by one card may disturb the bus, rendering it unusable by the other access cards; such a malfunction is known as a single source of failure. In communications system engineering, single source failures are to be avoided, if practical. Another drawback to using a shared bus is that it causes electrical noise, which can interfere with the performance of the switch.

In another implementation of a switching fabric, data can be transmitted serially to a central switching location; but this implementation also suffers from having a potential single source of failure, namely the central switching location.

In still another implementation, access cards can be connected with serial point-to-point links. Such a switching fabric can use any one of several clocking schemes. In one scheme, the clock signal can be embedded in the data being switched, as is done for both Ethernet and FDDI LANs, but the overhead required to synchronize the receiver to the transmitted clock is excessive in relation to the volume of data being transmitted. Alternatively, a data signal with an embedded clock could be run continuously, avoiding the overhead for synchronizing, but this would require a phase-locked loop for each line, use more power and generate more electrical noise. One could also use a high-speed sampling clock at the destination. This is the scheme used with Universal Asynchronous Receiver Transmitters (UARTs). However, for performance with a throughput of approximately 1.2 Gbps—what the present invention provides—a high speed sampling clock at the destination is impractical.

The present invention addresses the problems of a single source of failure in an application for switching variable-size frames at high throughput, in the neighborhood of 1.2 Gbps.

Although there is already a switching fabric in a telephony switch that, like the present invention, employs a full mesh of point-to-point links, such a telephony switch is used to switch voice traffic, and, appropriately, functions in a fundamentally different manner. Where the present invention switches data in segments (called buffers herein) and can use the same hardware connection for switching part of one logical unit of information at one instant, and part of another logical unit of information at another instant, the full-mesh fabric in the voice switching application sets up and maintains a dedicated connection for al segments of a logical unit of information.

SUMMARY OF THE INVENTION

The present invention is a high throughput, multiple-threaded switching fabric for switching variable-size frames of digital information; the switching fabric breaks each frame arriving at an ingress line processor, intended for an egress line processor, into smaller units of information called buffers herein, and transmits these buffers to the egress line processor. The switch system includes one or more access cards, each having ports for one or more digital communication lines. The switching fabric includes some of the components of some access cards of the switch system, and a backplane that interconnects these cards.

Each access card hosts one or more line processors connected through ports to the digital communication lines, and each line processor has an associated RAM on the access card. In the present invention, each access card hosts only one multiline serial communication controller (MSCC), a device that interfaces with each on-card line processor directly, through interrupts, and also through the line processor's associated RAM. Each MSCC is coupled to MSCCs on other cards through the backplane, which provides a full mesh of serial point-to-point links for bi-directional serial communication. The MSCC on each card is also connected back to itself through the backplane, this loopback allowing some built-in testing and also simplifying the design of the switch, because with loopback a line processor can perform the same steps to switch digital information to another line processor regardless of whether it is on the same or a different board.

The switching fabric of the present invention comprises a backplane and the MSCCs it links, where the MSCCs are, as described below, designed to move variable-size frames from the RAM associated with an attached ingress (source) line processor to the RAM associated with an egress, or destination line processor (which may be the same line processor as the ingress line processor). Examples of digital communication lines served by the switching fabric of the present invention include X.21, V.35, DS1, and DS3 lines.

The switching fabric of the present invention may be used in a switch that includes not only a switching fabric for frames, but a different switching fabric for fixed-size cells of digital information, such as Asynchronous Transfer Mode (ATM) cells. To enable the two switching fabrics to exchange digital information, the switching fabric of the present invention serves two kinds of access cards: a Variable Frame Coupler (VFC) card and a Cell Interconnect Gateway (CIG) card. A CIG card connects the frame switching fabric of the present invention to a cell switching fabric in the same switch system; it is a gateway to the cell switching fabric.

The line processors on a VFC card are called frame processors. They are connected directly to the digital communication lines between which digital information is being switched. The line processor on a CIG card (there is usually only one) is called a cell processor; it is also connected directly to digital communication lines, which lead to a cell switching fabric in the same switch system.

A CIG card also includes, for each cell processor, a frame processor that can be the same equipment as used on a VFC card. The CIG card frame processor is not connected directly to the digital communication lines, and so is not a line processor, but it is coupled through the cell processor to the digital communication lines attached to the CIG card. Neither cell processors nor frame processors are part of the switching fabric of the present invention.

The switching fabric of the present invention typically serves several VFC cards and one or two CIG cards. Whether the access card is of the VFC or CIG type, the switching fabric includes one MSCC on each card, although the MSCC on a CIG card is logically configured to perform in a slightly different manner. The part of the overall switching fabric on a CIG card uses the same hardware as the part on any VFC card. The part of the switching fabric on a CIG card differs from the part on a VFC card in only one way: the MSCC on a CIG is logically configured to know it is being used on a CIG card, and to therefore store digital information in the RAM on the CIG card contiguously.

The present invention provides switching at throughputs of approximately 1.2 Gbps (0.6 Gbps maximum throughput in each direction), so it is called a broadband switching fabric. It can be implemented at relatively low cost, requires relatively low power, and does not generate much electrical noise, compared to prior art broadband switching fabrics.

BEST MODE FOR CARRYING OUT THE INVENTION

The switching fabric of the present invention is specifically directed to switching frames, meaning herein variable-size packets of digital information, between an ingress digital communication line (a line on which a frame enters the switch) and an egress digital communication line (the line on which the frame will leave the switch). In switching a frame, the switching fabric breaks the frame into smaller units of data called buffers herein. These buffers in turn are transported via the switching fabric in a manner described more fully below.

Figure 1:
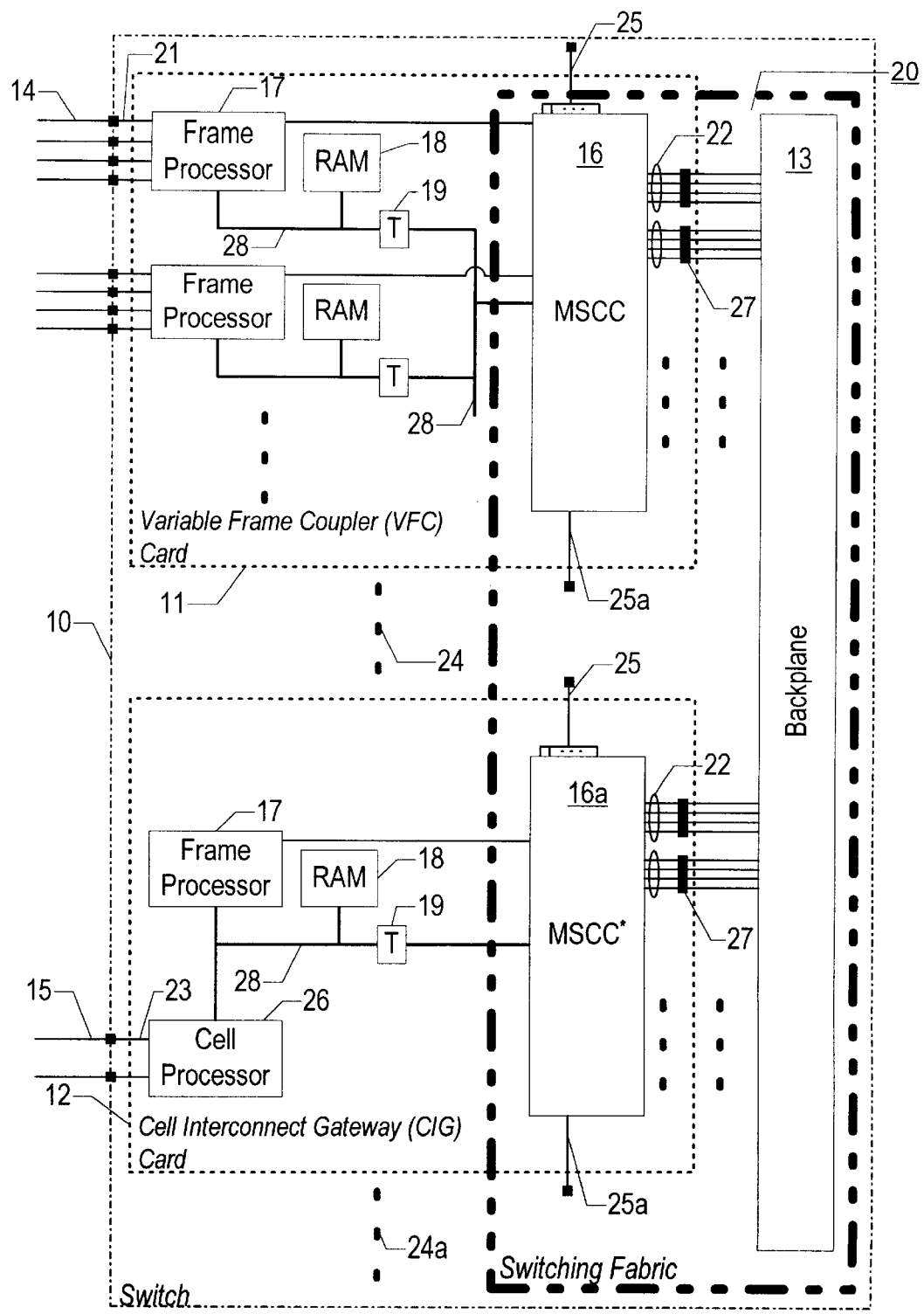
FIG. 1 is a block diagram of a switch according to the present invention.

Referring now to FIG. 1, a switching fabric 20 according to the present invention is used in a switch 10 that typically includes several access cards held in a chassis, each of which is either a VFC card 11 or a CIG card 12, all interconnected through a backplane 13. Each VFC card 11 has one or more VFC ports 21 connected to frame-bearing digital communication lines 14. Each CIG card 12 has one or more CIG ports 23 connected to cell-bearing digital communication lines 15. A cell as used herein refers to a fixed-size packet of digital information, such as a packet of digital information conforming to the ATM protocol. A CIG card includes a cell processor 26 that translates cells into frames, and vice versa, so that the switching fabric of the present invention switches, in fact, only frames.

In a preferred embodiment, a switching fabric according to the present invention is used by a switch that includes twelve access cards, which in turn can be any combination of VFC cards and CIG cards, although there are usually only one or two CIG cards served by the switching fabric of the present invention. FIG. 1 uses ellipses 24 and 24a to represent additional VFC cards and additional CIG cards, respectively. Both kinds of cards host at least one frame processor 17 and an associated Random Access Memory (RAM) 1. On a CIG card, there is usually only a single line processor, indicated as a cell processor 26, and one associated frame processor 17.

Each frame processor 17 on a VFC card 11 is connected to one or more VFC ports 21. Each frame processor and its RAM are interconnected through a local bus 28, and are both connected through a transceiver 19 to the MSCC 16 on the card; the MSCC is part of the switching fabric 20.

There is only one MSCC per VFC or CIG card, and it is connected through the backplane 13 by a group of four wires 22 (see also FIG. 3) to each card bearing an MSCC that is part of the switching fabric, including, in a loopback connection, to itself. Besides being used for normal switching between lines connected to the same card, this loopback is used to test many of the MSCC internal modules. In the preferred embodiment, the MSCC is a single microchip housing multiple hardware modules, which operate concurrently.

The lone cell processor 26 on a CIG card 12 is connected to an associated RAM 18 through the local bus 28. The lone frame processor on the CIG card is connected through the local bus 28 to the RAM 18.

The MSCC on a CIG card is the same piece of hardware as the MSCC on a VFC card. However, because of how the ATM Adaptation Layer is implemented in the cell processor on a CIG card, all the data from a frame sent to a CIG card must be placed in contiguous memory. To achieve this, the MSCC on a CIG card may use an input pin (not shown) to place it in CIG mode, instead of VFC mode. A logical '0' or '1' is applied to the input pin, controlled by software, to select the mode for the MSCC.

A VFC card can send a frame to a CIG card to be transmitted as one or more ATM cells. Conversely, a CIG card can send data from the received cell stream to a VFC card to transmit as a frame according to some frame communication protocol such as, for example, the Frame Relay protocol. In both cases, however, the switching fabric performs the same function: moving buffers from one mesh point of the switching fabric to another. The switching fabric is not required to make special provision for transferring ATM cells because the cell processor on a CIG card performs the ATM Adaptation Layer function of convening between frames and cells. Thus, a CIG card effectively exchanges only frames, not cells, with another access card tied into the switching fabric.

The clocking scheme of the present invention uses two clock sources regulating operation of the MSCCs: a backplane clock is used to generate a reference signal 25 for the clock and data information sent out on the backplane 13; and a local bus clock is used to generate a reference signal 25a for data signals transmitted on the local bus 28. In the preferred embodiment, the upper bound on frequency for the backplane clock is 80 MHz. The frequency is either 25 or 33 MHz for the local bus clock.

Figure 3:
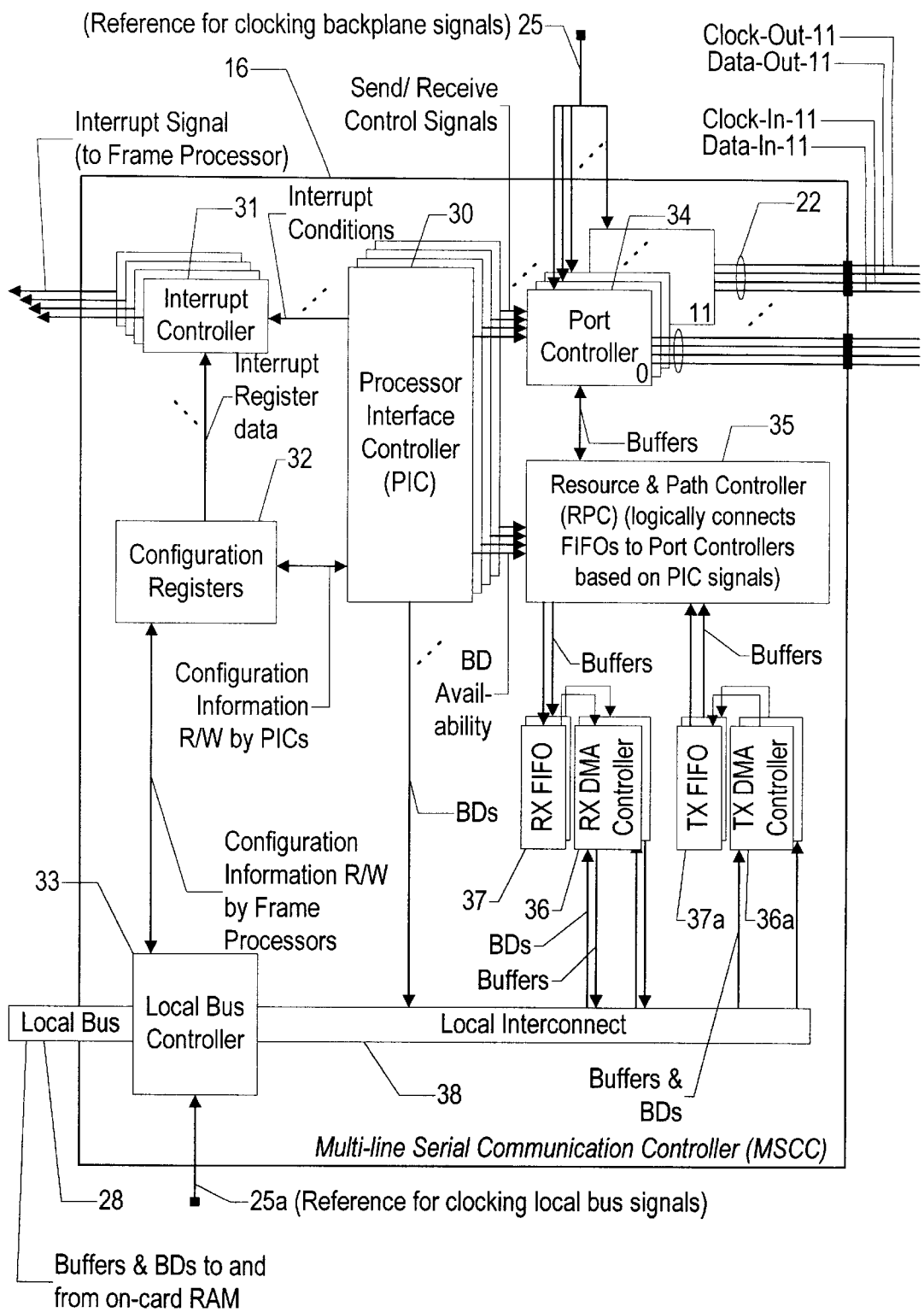
FIG. 3 is a block diagram of an MSCC according to the present invention.

In FIG. 1, the reference signal 25 from the backplane clock is shown being provided to each MSCC 16 and 16a. FIG. 3 shows this signal being provided to each of twelve Port Controllers 34, which interface the MSCC to the backplane. In FIG. 1, there is also shown the reference signal 25a from the local bus clock. In FIG. 3, this signal is seen to be provided directly to a Local Bus Controller 33.

Each of the twelve backplane ports has two differential outputs and two differential inputs; these inputs and outputs are conveyed by groups of wires 22 that connect to PECL translators 27. The MSCC has four single-ended CMOS signals per port. The PECL translators 27 convert the CMOS signals to differential signals, facilitating higher throughputs by the switching fabric. The two outputs consist of a clock signal and a data signal for an MSCC on another card. The two inputs are clock and data signals coming from the other card. The backplane clock reference signal provides timing information for the output data. Each card sources its backplane clock signal to all the other cards, offsetting the effects of timing skew. To conserve power and reduce crosstalk, the backplane clock signal is applied only when the data signal is valid. The backplane clock signals are run at 80 MHz, independent of any processor clocks on a card.

A Local Bus Controller (see 33 of FIG. 3) enables communication between an MSCC and the attached frame processors (those on the same card as the MSCC). It allows the frame processors to read and write internal MSCC registers, and the MSCC accesses the RAM associated with the attached frame processors through this controller. Each of the frame processors attached to the MSCC shares the Local Bus Controller 33 for these operations. The common bus interface is a Motorola 680×0 32-bit compatible data bus and control signals.) This controller operates in synchrony with other internal MSCC components, using a reference at a frequency up to 33 MHz for clocking local bus signals.

Figure 2:
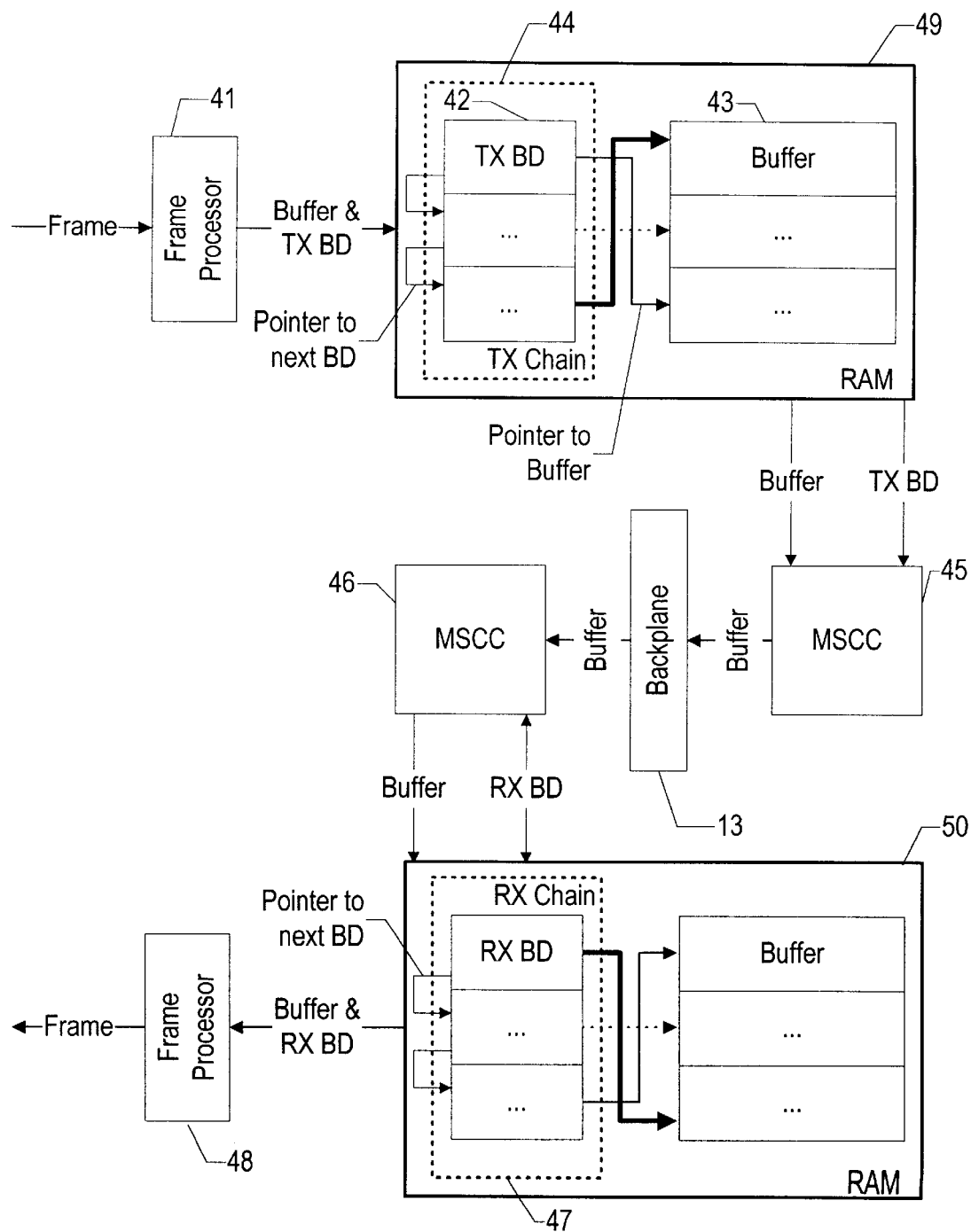
FIG. 2 is a diagram showing the flow of buffers from an ingress frame processor to an egress frame processor.

Referring now to FIG. 2, a frame, which in the preferred embodiment of the present invention can vary in size up to 64 Kbytes, is received at a VFC port by an ingress frame processor 41, which has an associated RAM 49. The frame processor segments the frame as it arrives by writing it to one or more buffers, appending, at the beginning of each buffer, some information, that the switching fabric treats in the same manner as the received data. The maximum amount of data in a buffer totals 304 bytes for both received data and any appended header The limit of 304 bytes in this embodiment arises because the MSCC uses First-In-First-Out memories (FIFOs) to store buffers only up to that size.

For each buffer 43, the frame processor creates a transmit buffer descriptor 42 used by the ingress side of the switching fabric, and adds it to a transmit chain 44, which is a linked list of buffer descriptors, storing the transmit chain in its associated RAM 49. The ingress card MSCC 45 loads a transmit buffer descriptor 42 and corresponding buffer 43 into its internal memory (a transmit FIFO 37a of FIG. 3), establishes a connection to the destination card MSCC 46 using an intercard communication protocol (ICP), which is a layer two protocol in the preferred embodiment, and specifies the destination frame processor 48. Then, if the destination MSCC accepts the transfer request, the ingress MSCC transfers the buffer over the backplane 13 in a series of 18-bit segments.

The destination MSCC 46 can accept an incoming request from the source MSCC 45 if and only if a fully correct decoding of the request is made. The decoding is deemed correct only after parity checking and checking for semantic consistency of the request. A protocol exchange between source MSCC 45 and destination MSCC 46 is also required, in order to proceed with the data transfer. This makes each individual board virtually insensitive to remote hardware failures.

Before accepting a request to receive a buffer from the ingress MSCC 45, the destination MSCC 46 must have pre-allocated a buffer descriptor from a receive chain 47 of the destination frame processor 48. If a receive buffer descriptor is preallocated, the destination MSCC 46 reads in the buffer from the backplane, writes it to the RAM 50 of the destination frame processor 48, updates the data of the receive buffer descriptor, and writes the updated receive buffer descriptor back to the receive chain. If the transfer of a buffer over the backplane 13 succeeds, the destination MSCC 46 will transmit an ACK to the sending MSCC 45. After all the buffers comprising the frame being switched are successfully transferred over the backplane 13, the destination frame processor 48 sends the buffers in order, as a single frame entity, out onto the destination digital communication line.

If the receiving MSCC 46 is not ready to receive a buffer, or there is a problem in transmission over the backplane 13, the receiving MSCC notifies the ingress MSCC 45 not just that a transmission has failed by transmitting to it an NACK, but also of the reason for the failure. When a buffer is successfully transferred, the egress MSCC also signals the ingress MSCC, in this case to indicate success. All of this signaling between frame processors is part of a more extensive error notification system implemented in the switching fabric of the present invention. The system also includes a flow control mechanism that allows a frame processor with only a few empty buffers to slow the rate of data sent to it.

A transmit buffer descriptor (BD) includes various items of information about its associated buffer, including what access card to send the frame to so it can be switched to its destination digital communication line. The ingress frame processor 17 determines the destination frame processor based on information carried by the frame, and based on software tables stored in the switch. Each frame carries an address called a Data Link Connection Identifier whose value identifies a Virtual Connection. Each frame processor has software tables stored in its RAM mapping a destination card and line lo a Virtual Connection. The tables are downloaded from a control unit board, not part of the present invention, that maintains the tables for the entire switch.

The switching fabric is not responsible for removing transmit buffer descriptors from the transmit chain; the frame processor is responsible. There are various ways a frame processor is prompted to remove a transmit buffer descriptor. One way is for the source MSCC, based on communication with the destination MSCC, to set a flag in the buffer descriptor, after a successful transfer, that can be polled by the frame processor. Another way is for the MSCC to send an interrupt to the ingress frame processor; the MSCC services the interrupt by removing the transmit buffer descriptor from the transmit chain.

In all, a transmit buffer descriptor consists of four kinds of information concerning the associated buffer and other aspects of the switching process.

1. The Buffer Status Register contains buffer transfer information for the ingress frame processor. When the buffer transfer has successfully completed or failed, the MSCC sets a Response-Ready flag and writes a Transmit-Success or Transmit-Fail flag in the Buffer Status Register, along with a failure reason code. In addition, a flow control byte sent by the source frame processor in a transfer acknowledgment is included if the transfer is successful 2. The Buffer Definition Register tells the MSCC where the buffer is going and what size it is. It also tells the MSCC what procedures to follow for interrupts and CIG transfers. If the buffer descriptor is the last one in the transmit chain, an End-of-List (EOL) flag is set, telling the MSCC it has reached the end of the transmit chain.

3. The Next Buffer Descriptor Location contains a pointer to the next buffer descriptor in the transmit chain. If the EOL flag is set, this pointer is not valid.

4. The Buffer Location contains a pointer to the buffer to be transmitted.

Referring now to FIG. 3, an MSCC of a switching fabric according to the present invention, whether for use on a VFC card or on a CIG card, is shown in block diagram detail. It is built, in the present embodiment, as a single microchip, on which all the component modules operate concurrently. It includes a set of multiplexers, indicated as the Local Interconnect 38, that allows data to be transferred between the external RAMs 18 (see FIG. 1) associated with the frame processors 17 and internal receive (RX) and transmit (TX) Direct Memory Access (DMA) Controllers 36 and 36a. Each MSCC has two TX and two RX FIFOs, and two TX and two RX DMA controllers.

Each MSCC also has four Processor Interface Controllers (PICs) 30, one for each of the maximum number of frame processors attached to the MSCC. Each PIC is connected to each of two TX and two RX DMA controllers through the Local Interconnect 38. Each PIC is also connected to twelve Port Controllers 34, to a Resource & Path Controller 35, to Configuration Registers 32, and to an Interrupt Controller 31 for the same frame processor as the PIC.

The FIFOs store buffers before transferring and after receiving them over the backplane. In moving a buffer from the RAM of an ingress frame processor to the RAM of an egress frame processor, the DMAs move buffers from the ingress RAM 18 (i.e., the RAM associated with the ingress frame processor) to the TX FIFO 37a on the ingress card, or from the RX FIFO 37 on the egress card to the egress RAM 18. To do this the DMAs read buffer descriptors. Buffer descriptors, however, are not transferred across the backplane, only buffers.

On a destination VFC card, in receiving a buffer destined for one of its frame processors, the PIC of the MSCC uses four internal registers it reserves for that frame processor. In all, on a VFC card in the preferred embodiment, the MSCC uses 16 registers for data reception, four for each of the four frame processors on the card. The MSCC on a CIG card uses internal registers differently in receiving a frame or cell over the backplane.

Unlike the transmit chain, the receive chain is set up during initialization with a constant number of at least two fixed-size buffer descriptors. Each receive buffer descriptor is made up of essentially the same four kinds of information included in a transmit buffer descriptor: status, definition, next receive buffer descriptor address, and buffer address. The MSCC sets the 'Full/Empty' flag in the status field after filling a buffer, then interrupts the frame processor after a number of transfers, configurable by software, have been received. The 'Full/Empty' flag tells the frame processor there is information for it in the data buffer, and tells the MSCC not to reuse the buffer until the frame processor clears the 'Full/Empty' flag.

Two TX FIFOs can simultaneously transfer buffers to different cards. Due to variable size buffers and destination card contention, some buffers may complete transfer before their predecessors in the transmit chain, but buffers being transferred between two cards will always arrive in order.

An MSCC also includes one or more Interrupt Controllers 31, one for each frame processor, each connected to its corresponding PIC 30. The Interrupt Controllers monitor interrupt conditions reported by the other MSCC components, asserting an interrupt signal when one or more conditions requiring an interrupt occur. The frame processor services the interrupt first by reading the interrupt register data stored in the interrupt register, one of the configuration registers 32, to determine the cause of the interrupt and then taking the appropriate action. The Interrupt Controller determines when the interrupt register has been read by the frame processor and then resets the register.

The MSCC includes a Port Controller 34 for each of the twelve ports for the backplane connection. Each Port Controller 34 is also connected to each of the PICs 30, and all are connected to a Resource and Path Controller 35, which is itself also connected directly to each PIC 30. The Resource and Path Controller 35 controls the mapping of the four FIFOs 37 and 37a (two TX and two RX FIFOs) to the twelve Port Controllers 34. When, for example, requests to transfer data to the card are received on several ports at once, the Resource and Path Controller 35 determines which two will be allowed to receive, assigns a RX FIFO to each, and sets up a path between each RX FIFO/Port controller pair. The Resource and Path Controller 35 can connect, simultaneously, in pairs, two RX FIFOs 37 to two Port Controllers 34.

The MSCC further includes Configuration Registers 32 accessible by the PIC and, via the Local Bus Controller 33, accessible by the frame processors on the card.

Now, in more detail, FIG. 2 shows a frame arriving at a VFC port, moving from the ingress frame processor, through the switching fabric to the egress frame processor, and out through the destination VFC port for the destination digital communication line.

The ingress frame processor segments an incoming frame into one or more buffers in RAM, including in the buffers some information that the destination frame processor will need to transmit the buffers as a frame entity. Then it creates a buffer descriptor that contains information about the buffer, such as its size, location in memory, and the switch output port. The ingress frame processor uses information included in the frame and the software tables stored in the switch to determine the correct destination frame processor. When it is ready to have the switching fabric transfer the buffer to the destination frame processor, the ingress frame processor places the buffer descriptor on the transmit chain, and asserts a Get-Transmit flag in a configuration register for its corresponding PIC in the MSCC, which then reads in the contents of the buffer descriptor.

When a TX DMA controller becomes available, the PIC transfers to it some of the information from the buffer descriptor; the information transferred includes the address of the current buffer descriptor in the RAM of the ingress frame processor. The TX DMA controller reads the buffer from the RAM of the ingress frame processor and places it into the TX FIFO. The Resource and Path Controller maps the TX DMA controller to a backplane Port Controller 34 based on the destination card identifier field. Only one of the two TX DMA controllers can be mapped to a particular Port Controller 34 at a time, but a Port Controller 34 can handle both a transmission and reception simultaneously.

The ingress card Port Controller 34 creates a connection with the egress card Port Controller 34. In setting up this connection, the ingress Port Controller 34 identifies the output frame processor to the destination MSCC. This done, the Port Controller 34 transfers the buffer to the egress card. At the end of the transfer, the ingress Port Controller 34 sends a cyclic redundancy check (CRC) sum to the destination card MSCC, which calculates its own CRC sum. If the two sums agree, i.e. if the transfer was successful, the destination card MSCC sends the ingress card MSCC an acknowledgment signal (ACK) along with a flow control information byte. Otherwise, a negative acknowledgment signal (NACK) is returned, with a failure code identifying the cause of the failed transmission.

Based on the feedback from the destination MSCC, the TX DMA controller writes to the transmit buffer descriptor a status identifying the success or failure of the transfer, the flow control information, and, if appropriate, the failure code. The TX DMA controller may, optionally, send an interrupt to the ingress frame processor via the Interrupt Controller for that frame processor. The use of such an interrupt is signaled using one of the fields in the transmit buffer descriptor.

On the destination card side of the switching fabric, before receiving a request to accept transfer of a buffer, the PIC corresponding to the destination frame processor must have pre-allocated a receive buffer descriptor from its receive chain. If not, the destination card MSCC (in particular, the destination card PIC) will refuse a request to accept a buffer for that frame processor.

By pre-allocating a buffer descriptor from the receive chain of the destination frame processor, the PIC of the destination card ensures that a buffer is available. When a Port Controller 34 of the MSCC receives a transfer request, which indicates the destination frame processor, the MSCC checks that the destination frame processor is operable and that a receive buffer descriptor is available (has been pre-allocated) in the RAM of that frame processor. If not, a negative acknowledgment (NACK) is returned to the source card. Otherwise, the Port Controller 34 issues a request to the destination Resource and Path Controller, which waits until a RX DMA controller is available, and then sets up a path between the Port Controller 34 and the associated RX DMA controller.

Once a transfer request has been granted, the destination PIC pre-allocates another receive buffer descriptor from the receive chain for a subsequent transfer.

The RX DMA controller reads from the PIC some of the contents of the receive buffer descriptor being used for the transfer. The destination card then issues a Clear to Send (CTS) signal to the ingress cad, which then transmits the buffer in the TX FIFO in 16-bit pieces.

These 16-bit buffer segments could be either data, as when they are part of a frame being sent from one card to another, or code-words, according to the ICP, sent from one MSCC to another to coordinate the action of the different MSCCs of the switching fabric. To enable a receiving MSCC to distinguish between a buffer segment that is data and one that contains a code-word, each 16-bit segment is prefaced with one bit that is '0' for data and '1' for a code-word. In addition, to signal the end of a segment, a final bit is axed that is always a '0'. Thus, both data and code-words flow across the backplane from one card to another in 18-bit segments, counting the two added bits.

When a buffer reaches the destination card, the card's Port Controller places it in the RX FIFO. From there, the RX DMA controller moves the buffer outside the switching fabric to the RAM of the destination frame processor. The RX DMA controller does not wait for the whole buffer to be transferred; it moves the buffer segments as soon as memory in the destination RAM is available. When the entire buffer has been received and transferred to the destination RAM, an ACK is sent to the ingress MSCC.

The status of the received buffer is written to the receive buffer descriptor, including the buffer size and the source frame processor identifier.

VFC Card to CIG Card Transfers

The switching fabric of the present invention also provides for sending a variable-size frame from a VFC card to a CIG card. The mechanics of this digital switching are essentially the same as for sending a frame from one VFC card to another: in both cases, the switching fabric segments the digital information into buffers and sends the buffers across the backplane. There are some differences, however; on a CIG card, the buffers are stored in RAM contiguously.

A VFC card sends a frame to a CIG card in buffers up to 304 bytes long, just as when sending frames to another VFC card. But in a CIG transfer, each buffer descriptor includes a flag indicating whether it is a start, middle, or end buffer in the buffer series making up the frame. In sending buffers to a CIG card, all of the transmit buffer descriptors are placed in order on the transmit chain. Multiple transmit buffer descriptors are needed because the frame is not stored in contiguous memory in the RAM of the source frame processor on the VFC card, and because the frame may exceed 304 bytes, requiring multiple buffers, each needing a buffer descriptor.

The ingress VFC frame processor waits until the entire frame has been received over the digital communication line before forwarding it to the destination CIG card. When the MSCC on a VFC card transmits, to a CIG MSCC, buffers making up a frame, it sends the buffers for the entire frame before sending buffers for another CIG transfer; it does not interleave buffers from two separate tramit chain entries destined for the same CIG card.

In CIG mode, since in the preferred embodiment there is only one cell processor and associated frame processor on a CIG card, the MSCC does not need all four of the PICs 30 it uses on a VFC card. On a CIG card, the MSCC uses only two PICs: one for CIG mode transfers—and thus as a true processor interface controller—and the other for administration. The true PIC 30 maintains twelve linked lists for received transfers, one for each possible source card, including itself. Each linked list can have buffers of a different size since it is configured by software. Because each source card has its own receive chain, each can place fragments of frames into a buffer without interference from other cards.

In the MSCC of a CIG card, the true processor interface controller maintains four Configuration Registers 32 for each of the twelve linked lists. The first is a pointer to the next memory location in RAM where the MSCC is writing the buffer being transferred over the backplane; the second is a pointer to the current receive buffer descriptor in the receive chain (which is in the RAM of the destination frame processor); the third is a pointer to the next receive buffer descriptor in the receive chain; and the fourth register is a running total of the buffer size along with the maximum allowable size.

When a buffer is preallocated for one of the receive chains, the receive buffer descriptor contents are stored in these registers 32. When a buffer arrives at a CIG card over the backplane, the four register locations corresponding to the arrival port are copied to the assigned RX DMA. The RX DMA of the CIG MSCC writes the buffer immediately to the RAM of its sole on-card frame processor, which it is able to do in this embodiment because, as explained above, the egress card MSCC has in its internal memory the address of where to write the buffer. At the end of a transfer, the RX DMA controller points to the memory location where the following fragment is to be written. If the fragment is not the last fragment of a frame, then the memory location and the running total of the buffer size are copied back to the Configuration Registers 32. If the fragment is the last one in the frame, which would be indicated by the 'End' flag in the buffer header, then the next receive buffer descriptor from the receive chain is read into the MSCC, preallocating a receive buffer descriptor for a future transfer.

In this scheme, a CIG can receive large frames in contiguous memory, while short frames do not suffer at the expense of longer frames. Also, the CIG can set up buffer sizes appropriate to the different VFC cards of the switch.

CIG Card to VFC Card Transfers

When a CIG transfers a large frame to a VFC card, it places multiple buffer descriptors on the transmit chain so that the MSCC on the CIG card again sees only 304-byte buffers. These buffers are usually placed in non-contiguous memory locations on the receiving VFC card; there is no requirement for these buffers to be stored contiguously in the RAM of the egress frame processor. The buffer descriptors on the receive chain indicate the source card (a CIG card in this case) and include the start, middle and end flags. Buffers from different large frames do nor become interleaved because the frames only come from one PIC on the ingress CIG card. The frame processor on the destination VFC card reassembles the buffers using the receive buffer descriptors provided by its MSCC. In providing the receive buffer descriptors, the destination MSCC uses information communicated by the ingress MSCC, according to the ICP, through the start, middle and end flags, Buffer Swapping on a CIG Card For Larger Frames A CIG card uses a standard buffer size to receive frames If a frame is larger than the standard buffer size, then a larger buffer is needed. The VFC card must tell the CIG card that it needs a larger buffer. There is a special flag in the transmit chain buffer descriptor to do this. The frame processor on the CIG card receives an interrupt sent by the MSCC on the VFC card, and a field in the receive chain buffer descriptor causes the frame processor to replace a standard buffer with a larger one. A three-bit field is passed with the interrupt to indicate the size of the larger buffer. After the buffer swap, the CIG card sends an interrupt to the VFC card, signaling that the VFC card can transfer the larger frame. The CIG card communicates the interrupt to the VFC card by transferring a similar buffer swap interrupt back to the source VFC with the three-bit field set to indicate that the buffer swap is complete.

Congestion Notification

When a card runs out of buffers, it will not accept buffer transfers from other cards. To prevent this condition from causing congestion in the switching fabric, a mechanism is implemented in the present invention by which source card frame processors control their rate of sending information to destination frame processors, depending on the status of the egress card frame processors.

In the present invention, the frame processor can distinguish between different levels and types of congestion. Congestion depends on the number of free buffers available in the RAM of the destination frame processor, the frame processor utilization, and other factors. This information is coded by the destination frame processor into a byte called the congestion field written to one of the Configuration Registers in its MSCC; it updates the field whenever its congestion level changes. The congestion field value is sent to a source card via the acknowledgment (ACK) at the end of successful transfer, and lets a sending VFC card know at what rate the destination VFC can receive data. When the congestion field indicates that the destination VFC card is running low on buffers, the source card scales back its rate of transmission, so that buffer depletion occurs only rarely.

The source card frame processor can increase or decrease the rate of flow to a destination frame processor by altering how often it places buffers for the destination card on the transmit chain. It can also discard frames that are indicated as low priority by a "discard eligible" bit according to the Frame Relay protocol.

Configuration Registers

Some of the internal memory of an MSCC is addressable by the frame processors on the same card, allowing those frame processors to directly read and write internal MSCC configuration registers 32. These registers are used to initialize and configure the MSCC. Each frame processor has its own section of MSCC address space. Registers which configure variables for the entire MSCC are contained in separate sections of the addressable space. All addressable registers in the MSCC are readable; there are no write-only registers. To prevent race conditions between the hardware and software, some MSCC registers must be read before their values can be overwritten by the frame processor.

Error Protection

In the preferred embodiment, to protect against transfer errors occurring between a RAM and its MSCC, the MSCC generates a parity bit when writing to RAM and checks the parity bit it generated when reading from RAM. Both odd and even parity are supported.

For transfer across the backplane, protection against errors is provided differently for data and code-words. CRC protection is used for data transmitted between MSCC devices across the back plane. An 8-byte CRC is generated by both the ingress and destination MSCC. The ingress CRC sum is sent to the destination MSCC, which compares it with its own CRC sum. For code-words sent between MSCC devices, on the other hand, parity protection is used. The combination of the protection across the backplane and protection between RAM and MSCC provides end-to-end protection of user data.

CONCLUSION

Although the invention has been shown and described with respect to a best mode embodiment thereof, it should be understood by those skilled in the art that the foregoing and various other changes, omissions and additions in the form and detail thereof, such as the number of access cards served by the switching fabric, may be made therein without departing from the spirit and scope of the invention.

Having now disclosed the invention, what is claimed is:

1. A switching fabric (20), for switching frames of digital information as a sequence of buffers, each buffer containing a portion of each of the frames to be switched, for use in a switch system (10) having a plurality of processor means for receiving and transmitting frames, each said processor means coupled to at least one bi-directional digital communication line (14, 15), the switch system for switching frames between digital communication lines coupled to said processor means, the switching fabric comprising:

a) a plurality of multi-line serial communication controllers, MSCCs, (16, 16a), each connected to at least one processor means, each MSCC having means for receiving from, and outputting to, the processor means the sequence of buffers; and b) a backplane (13) connected to each MSCC through a plurality of connections (22) so as to interconnect every MSCC of the switching fabric in a full mesh of bi-directional serial point-to-point links, the backplane for receiving from an MSCC the sequence of buffers and for providing said sequence of buffers to a corresponding MSCC connected to the processor means that is coupled to the destination digital communication line;

wherein, for each buffer, the MSCC providing the sequence of buffers to the backplane first sends a transfer request over the backplane to the MSCC coupled to the destination digital communication line, and does not transfer the buffer until the transfer request is accepted.

2. A switching fabric as claimed in claim 1, wherein the backplane interconnects at least one MSCC via a serial point-to-point link with itself and wherein said at least one MSCC includes means for receiving buffers from the backplane that were output by the same MSCC.

3. A switching fabric as claimed in claim 1, wherein the backplane plurality of connections forming the full mesh of bi-directional serial point-to-point links comprises, for each such link, a data link and a separate clock link.

4. A switching fabric as claimed in claim 3, wherein the data link consists of an incoming data signal and a separate outgoing data signal, and wherein the clock link consists of an incoming clock signal and a separate outgoing clock signal.

5. A switching fabric as claimed in claim 3, wherein each MSCC uses a first reference clock signal for providing clock-out signals and for clocking data-out signals, both the clock-out signals and data-out signals for transmitting across the backplane.

6. A switching fabric as claimed in claim 1, wherein each first MSCC has means to transfer flow-control information about each processor means connected to the first MSCC to a second MSCC that is to output buffers to the first MSCC.

7. A switching fabric as claimed in claim 1, wherein each processor means of the switch system includes a random access memory (RAM) in which buffers are stored for transfer to and from the backplane under the control of the MSCC connected to said processor means.

8. A switching fabric as claimed in claim 7, wherein at least one MSCC has means for contiguously writing or reading in the RAM of the interconnected processor means all buffers that form a single frame of digital information.

9. A switching fabric as claimed in claim 1, wherein each first MSCC has means to update a congestion field associated with said first MSCC, wherein the congestion field is transferred via the backplane to a second MSCC that is to output buffers to the first MSCC so as to facilitate the output of said buffers to the first MSCC.

10. A switching fabric as claimed in claim 1, wherein each processor means has means for generating a buffer descriptor that contains information concerning an associated buffer and wherein the MSCC has means for using the buffer descriptor to facilitate the transfer of buffers.

11. A switching fabric as claimed in claim 1, wherein at least one processor means includes a cell processor for transfer of ATM cells, and wherein the MSCC connected to said at least one processor means has means for controlling the storage of buffers associated with said ATM cells in contiguous memory locations of said at least one processor means.

12. A switching fabric (20), for switching frames of digital information as a sequence of buffers, for use in a switch system (10) having a plurality of frame processors (17), each with an associated RAM, and each frame processor (17) coupled to a plurality of digital communication lines (14, 15), the switching fabric comprising:

a) a plurality of multi-line serial communication controllers, MSCCs, (16, 16a), each of which can serve as either an ingress MSCC or an egress MSCC, an ingress MSCC for inputting frames of digital information into the switching fabric, and an egress MSCC for outputting from the switching fabric frames of digital information, each MSCC attached to at least one frame processor and the frame processor's associated RAM through a local bus, for receiving from, and outputting to, the frame processor through its associated RAM the sequence of buffers, each MSCC also connected directly to each attached frame processor for signaling interrupts; and b) a backplane (13) connected to each MSCC through a plurality of connections (22) so as to interconnect every MSCC of the switching fabric in a full mesh of bi-directional serial point-to-point links, and so as to connect, in a loopback, each MSCC to itself, the backplane for receiving from an ingress MSCC the sequence of buffers and for providing said sequence of buffers to an egress MSCC;

wherein, for each buffer, the ingress MSCC first sends to the egress MSCC a transfer request, and does not transfer the buffer until the transfer request is accepted.

13. A switching fabric as claimed in claim 12, wherein the backplane plurality of connections forming the full mesh of bi-directional serial point-to-point links comprises, for each such link, a data link and a separate clock link.

14. A switching fabric as claimed in claim 13, wherein the data link consists of an incoming data signal and a separate outgoing data signal, and wherein the clock link consists of an incoming clock signal and a separate outgoing clock signal.

15. A switching fabric as claimed in claim 13, wherein each MSCC uses a first reference clock signal for providing clock-out signals and for clocking data-out signals, both the clock-out signals and data-out signals for transmitting across the backplane.

16. A switching fabric as claimed in claim 15, wherein each MSCC further uses a second reference clock signal, the second reference clock signal for clocking data signals for transmitting on the local bus.

17. A switching fabric as claimed in claim 12, wherein each egress MSCC signals, to any corresponding ingress MSCC, flow-control information about each frame processor connected to the egress MSCC, thereby smoothing the flow of buffers through the switching fabric.

18. A switching fabric as claimed in claim 12, wherein at least one MSCC is software-controlled to store and read contiguously, in the RAM of an attached frame processor, all buffers making up a frame of digital information.

19. A switching fabric as claimed in claim 12, wherein an egress frame processor attached to an MSCC of the switching fabric updates a congestion field stored in the MSCC, wherein the congestion field is conveyed to an ingress MSCC of the switching fabric at the end of a buffer transfer, and the ingress MSCC notifies the ingress frame processor of receipt of the congestion field.

20. A switching fabric as claimed in claim 12, wherein an MSCC attached to a frame processor pre-allocates a partition of the RAM of the frame processor adequate to store a buffer descriptor and its associated buffer, before it accepts a new buffer over the backplane.

21. A switching fabric as claimed in claim 12, wherein, in a transfer of a frame of digital information from an ingress frame processor to an egress cell processor with an associated RAM, of which the cell processor usually uses a certain size partition to store a frame of digital information, where the frame of digital information is larger than the usual partition of the cell processor's RAM, the MSCC attached to the ingress frame processor signals the MSCC attached to the egress frame processor to secure a partition adequate to hold the larger frame of digital information, and the MSCC attached to the egress frame processor signals the MSCC attached to the ingress frame processor to transfer the larger frame of digital information over the backplane as a series of buffers and writes the buffers contiguously to the RAM of the attached egress frame processor in the larger partition.

22. A switching fabric as claimed in claim 12, wherein each MSCC comprises:

a) a Local Bus Controller (33) for enabling communication of buffers and buffer descriptors, via the local bus, between the MSCC and each attached frame processor and its associated RAM, responsive to a reference clock signal for clocking data signals transmitted on the local bus;

b) Configuration Registers (32) for storing configuration information, including buffer and buffer descriptor information, responsive to updates of the configuration information, for providing access to the stored configuration information;

c) an Interrupt Controller (31), associated with a particular attached frame processor, responsive to interrupt register data and to signals of interrupt conditions, for asserting an interrupt signal to the particular attached frame processor when an interrupt condition is signaled, and for de-asserting the interrupt signal when the interrupt is serviced by the particular attached frame processor;

d) a Processor Interface Controller (30) associated with each Interrupt Controller (31), responsive to configuration information, for providing interrupt conditions, for providing send/receive control signals, for providing buffer descriptor availability, and for providing buffer descriptors for buffers to be transmitted, these transmit buffer descriptors indicating the frame processor to receive the buffers to be transmitted;

e) a Port Controller (34) for each MSCC of the switching fabric, responsive to received clock and data signals arriving over the backplane, for providing transmitted clock and data signals over the backplane, both the received and transmitted data signals including buffers and code-words for managing communication, according to an Intercard Communication Protocol, and responsive to the backplane send/receive control signal and to the first reference clock signal, which provides clock-out signals and clocks data-out signals;

f) a Resource and Path Controller (35), a plurality of RX FIFOs for holding buffers arriving from the backplane, and a plurality of TX FIFOs for holding buffers destined for the backplane, the Resource and Path Controller for logically connecting, based on buffer descriptor availability signals from the Processor Interface Controller, one of said RX FIFOs or one of said TX FIFOs to one of said Port Controllers;

g) a plurality of RX DMA controllers, each associated with one of said RX FIFOs, each RX DMA controller for reading buffers from the associated RX FIFO and, based on information conveyed as buffer descriptors from the Processor Interface Controller, writing them, through the Local bus Controller, to the RAM of one of the attached frame processors; and h) a plurality of TX DMA controllers, each associated with one of said TX FIFOs, responsive to buffer descriptors provided by the Processor Interface Controller, for reading buffers from the RAM of one of the attached frame processors according to the buffer descriptor provided by the Processor Interface Controller, and for writing the buffers to its associated TX FIFO;

thereby communicating buffers in the RAM of an attached frame processor to the backplane, and communicating buffers arriving over the backplane to the RAM of an attached frame processor.

23. A switching fabric as claimed in claim 22, wherein more than one TX FIFO in an MSCC simultaneously transmits, across the backplane, buffers destined for frame processors attached to the switching fabric.

24. A switching fabric as claimed in claim 12, wherein the plurality of connections (22) between the backplane (13) and each MSCC is a plurality of differential connections.

* * * * *

UNITED STATES PATENT AND TRADEMARK OFFICE
CERTIFICATE OF CORRECTION

PATENT NO. : 6,031,843
DATED : February 29, 2000
INVENTOR(S) : Swanbery et al.

It is certified that error appears in the above-identified patent and that said Letters Patent is hereby corrected as shown below:

1. INID [56] References Cited
   U.S. PATENT DOCUMENTS

| | | | | |
   |---|---|---|---|---|
   | -- RE 34,755 | 10/1994 | Eng et al | 370/60 | -- should be added. |
   | -- RE 34,811 | 12/1994 | Eng et al | 370/60 | -- should be added. |
   | -- 5,172,371 | 12/1992 | Eng et al | 370/60 | -- should be added. |
   | -- 5,260,934 | 11/1993 | Tanaka et al | 370/54 | -- should be added. |
   | -- 5,260,935 | 11/1993 | Turner | 370/60 | -- should be added. |
   | -- 5,289,461 | 2/1994 | de Nijs | 370/58.1 | -- should be added. |
   | -- 5,305,311 | 4/1994 | Lyles | 370/60 | -- should be added. |
   | -- 5,309,432 | 5/1994 | Kanakia | 370/60 | -- should be added. |
   | -- 5,311,509 | 5/1994 | Heddes et al. | 370/60 | -- should be added. |
   | -- 5,321,691 | 6/1994 | Pashan | 370/58.3 | -- should be added. |
   | -- 5,327,420 | 7/1994 | Lyles | 370/60 | -- should be added. |
   | -- 5,329,524 | 7/1994 | Paker et al. | 370/58.1 | -- should be added. |
   | -- 5,339,311 | 8/1994 | Turner | 370/60 | -- should be added. |
   | -- 5,390,170 | 2/1995 | Sawant et al. | 370/58.1 | -- should be added. |
   | -- 5,402,415 | 3/1995 | Turner | 370/60 | -- should be added. |
   | -- 5,408,463 | 4/1995 | Merchant et al. | 370/16 | -- should be added. |
   | -- 5,412,653 | 5/1995 | Hoppe et al. | 370/58.2 | -- should be added. |
   | -- 5,422,880 | 6/1995 | Heitkamp et al. | 370/60 | -- should be added. |
   | -- 5,430,716 | 7/1995 | Pawelski | 370/58.1 | -- should be added. |
   | -- 5,434,852 | 7/1995 | LaPorta et al. | 370/58.2 | -- should be added. |
   | -- 5,436,893 | 7/1995 | Barnett | 370/60.1 | -- should be added. |

Signed and Sealed this

Nineteenth Day of February, 2002

*Attest:*

*Attesting Officer*

JAMES E. ROGAN
*Director of the United States Patent and Trademark Office*